United States Patent [19]

Ishii et al.

[11] Patent Number: 5,025,202
[45] Date of Patent: Jun. 18, 1991

[54] SOLAR CELL POWER SYSTEM WITH A SOLAR ARRAY BUS LOCKUP CANCELLING MECHANISM

[75] Inventors: Akihiko Ishii; Yukihiro Honda; Toshio Matsui, all of Kanagawa, Japan

[73] Assignee: Mitsubishi Denki Kabushiki Kaisha, Tokyo, Japan

[21] Appl. No.: 579,073

[22] Filed: Sep. 7, 1990

[30] Foreign Application Priority Data

Sep. 8, 1989 [JP] Japan ................................. 1-233733
Oct. 13, 1989 [JP] Japan ................................. 1-266559
Feb. 26, 1990 [JP] Japan ................................. 2-44728

[51] Int. Cl.$^5$ ............................................. H02J 7/00
[52] U.S. Cl. ...................................... 320/32; 320/14; 323/906
[58] Field of Search .................... 323/299, 906; 320/2, 320/13, 14, 32, 39; 307/44, 46

[56] References Cited

U.S. PATENT DOCUMENTS

| 3,600,599 | 8/1971 | Wright et al. | 323/906 |
| 4,281,278 | 7/1981 | Bilsky et al. | 320/13 |
| 4,313,078 | 1/1982 | Bilsky et al. | 323/906 |
| 4,404,472 | 9/1983 | Steigerwald | 320/32 |
| 4,678,983 | 7/1987 | Rouzies | 323/906 |
| 4,714,868 | 12/1987 | Maruyama et al. | 320/5 |

OTHER PUBLICATIONS

Capel et al.; "Influence of the Bus Regulation on Telecommunication Spacecraft Power System and Distribution"; IEEE PESC, Jun. 24–28, 1985, pp. 307–318.
Lacore, "Analysis of Power Bus Topology Used in Telecommunications Satellites"; Proceedings of the European Space Power Conference, Oct. 2–6, 1989, pp. 99–109.

Primary Examiner—Peter S. Wong
Attorney, Agent, or Firm—Wolf, Greenfield & Sacks

[57] ABSTRACT

A solar cell power system includes a device which determines the occurrence of solar array bus lockup by detecting the voltage of the power bus, the discharge current of the storage battery, and the solar array current (or the load current) and performing a calculation using these items of data in addition to the regulated bus voltage to emit a lockup signal, by which the magnitude of the load is reduced, thereby cancelling the lockup state. Alternatively, a solar cell system may include a lockup cancelling drive device, which accumulates in a coil cancelling-drive, energy supplied from the storage battery and then discharges this energy to the power bus, thereby cancelling the lockup stage without reducing the magnitude of the load.

26 Claims, 7 Drawing Sheets

SOLAR CELL POWER SYSTEM WITH A SOLAR ARRAY BUS LOCKUP CANCELLING MECHANISM

BACKGROUND OF THE INVENTION

1. Field of the Invention

This invention relates to a solar cell power system, and in particular, to a solar cell power system for satellites or the like which is of the type adapted to supply power from a solar cell to a load during the sunlight while stabilizing the voltage by means of a shunt device, and also to supply power to the load through discharge from a storage battery in the eclipse time, the system having a solar array bus lockup cancelling mechanism which serves to cancel a stage in which the voltage of the solar cell power system is fixed to that of the storage battery during the sunlight and a battery continues to discharge for a long time even when the power supply to the load can be met solely with the power generated by the solar cell (The state will be hereinafter referred to as "solar array bus lockup") so that the system is restored to a state in which the voltage is regulated by the shunt device.

2. Description of the Prior Art

Figure 1:
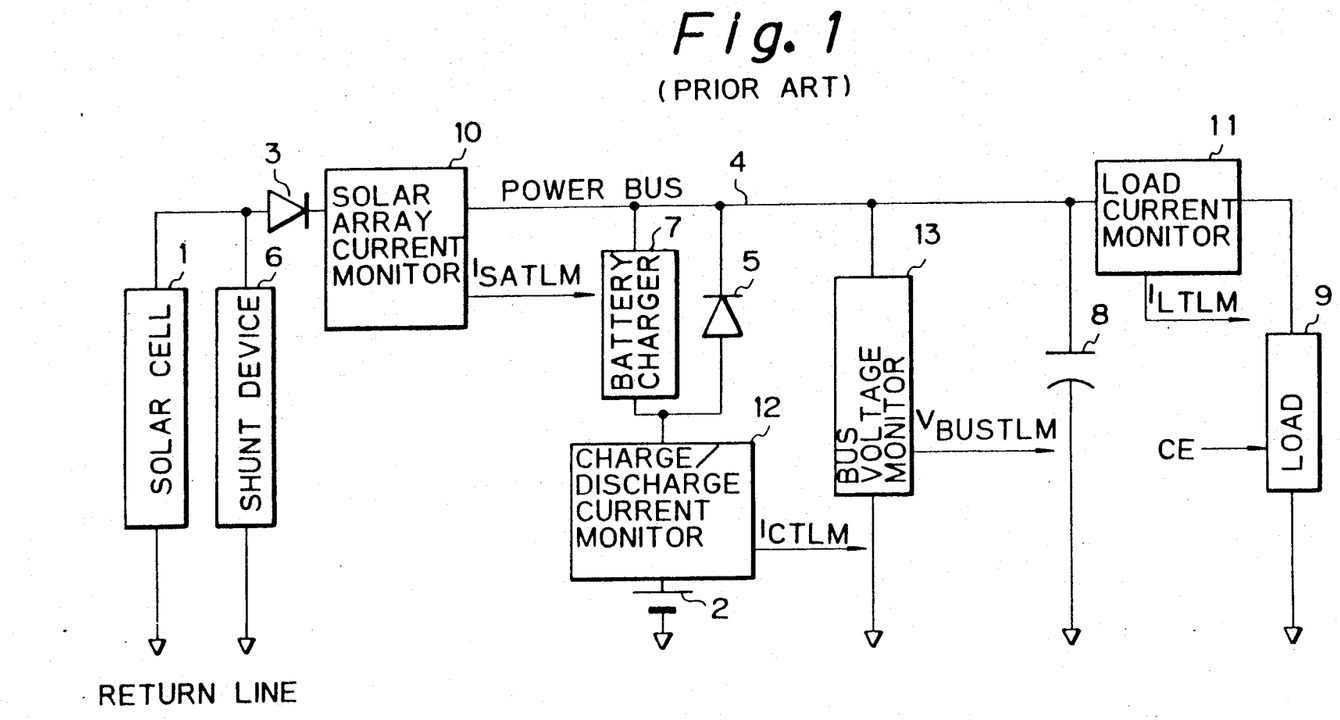
FIG. 1 is a diagram showing the construction of a conventional solar cell power system.

FIG. 1 is a block diagram showing the construction of a conventional solar cell power system, which includes a solar cell 1, a storage battery 2, a first diode 3 whose anode is connected to the output terminal of the solar cell 1, and a power bus 4 which is connected to the cathode of the first diode 3.

The system further includes a second diode 5 whose cathode is connected to the cathode of the first diode 3 through the power bus 4; a shunt device 6, which is connected between the anode of the first diode 3 and a return line (hereinafter referred to simply as RTN) in parallel with the solar cell 1, and which is adapted to consume any surplus power generated by the solar cell 1; a battery charger 7, which is connected to the power bus 4 in parallel with the second diode 5 and which serves to charge the storage battery 2 during the sunlight; a capacitor bank 8 which is connected between the power bus 4 and the RTN; and a load 9 which is connected to the power bus 4 and the RTN, and whose magnitude is set at the ground station with a command CE. In addition, the system includes a solar array current monitor 10, which is adapted to detect the level of the current flowing through the first diode 3 into the power bus 4 and convert it to a telemetry signal $I_{SATLM}$ before its transmittal; a load current monitor 11, which is adapted to detect the level of the current flowing through the power bus 4 into the load 9 and convert it to a telemetry signal $I_{LTLM}$ before its transmittal; a charge/discharge current monitor 12, which is connected between the anode of the second diode 5 and the storage battery 2, and which is adapted to detect the level of the charge/discharge current of the storage battery 2 and convert it to a telemetry signal $I_{CTLM}$ before its transmittal; and a bus voltage monitor 13 which is adapted to detect the voltage of the capacitor bank 8 and convert it to a telemetry signal $V_{BUSTLM}$ before its transmittal.

The operation of this conventional power system will now be described in detail.

During the sunlight, the power generated by the solar cell 1 is supplied to the load 9 through the first diode 3. Any surplus power that results when the power generated by the solar cell 1 exceeds the power consumed by the load 9 is partly converted by the battery charger 7 to charge the storage battery 2, and the rest is consumed by the shunt device 6.

In this process, the voltage of the capacitor bank 8 (hereinafter referred to as bus voltage) is regulated to a value $V_{SHNT}$. The value of the bus voltage $V_{SHNT}$ is generally set to be constantly higher than that of the voltage $V_{BAT}$ of the storage battery 2.

Figure 2:
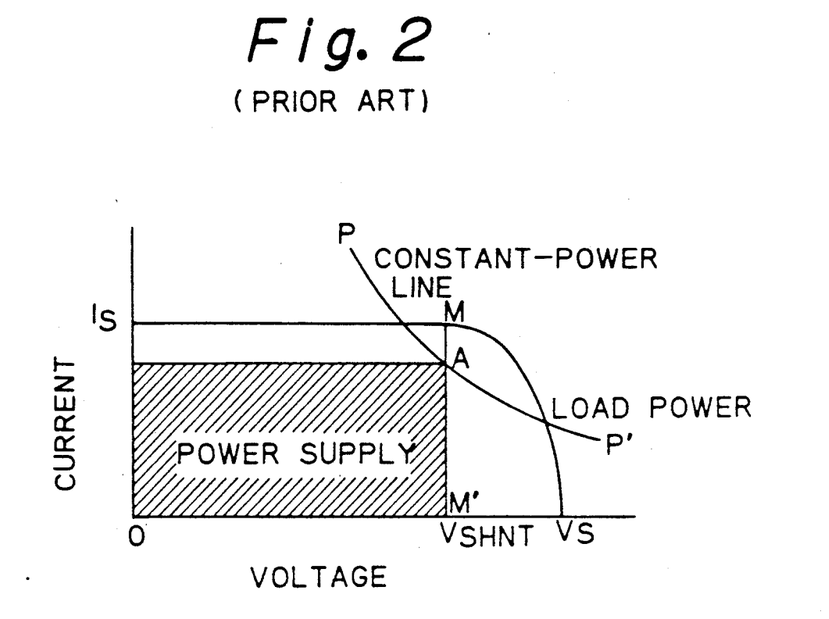
FIG. 2 is a diagram showing the relationship between the power generated by the solar cell and the load power consumed by the load in the solar cell power system shown in FIG. 1.

FIG. 2 shows the relationship between the power generated by the solar cell 1 and the load power consumed by the load 9. The power generated by the solar cell 1 is represented by the $I_S$-$V_S$ curve of FIG. 2. The load 9 appears to be a constant-power load since it generally contains a built-in DC/DC converter and consumes power while converting the bus voltage to an appropriate constant voltage. Accordingly, the relationship between the load voltage and the load current can be represented by the curve P—P' shown in FIG. 2.

As stated above, the shunt device 6 consumes any surplus power generated by the solar cell 1 so that the bus voltage may be regulated to $V_{SHNT}$. As a result, the intersection point A of the straight line M—M' and the constant power line P—P' of FIG. 2 represents the power operating point.

In the eclipse time, power generation by the solar cell 1 is stopped, so that power is supplied to the load 9 through discharge of the storage battery 2 through the intermediation of the second diode 5. The bus voltage at this time is equal to the discharge voltage $V_{BAT}$ of the storage battery 2.

In order to monitor the operating condition of the power system, the solar array current monitor 10, the load current monitor 11, the charge/discharge current monitor 12, and the bus voltage monitor 13 detect the current or voltage level at different parts of the system, as stated above, and convert them to telemetry signals, which are transmitted to the ground station.

Figure 3:
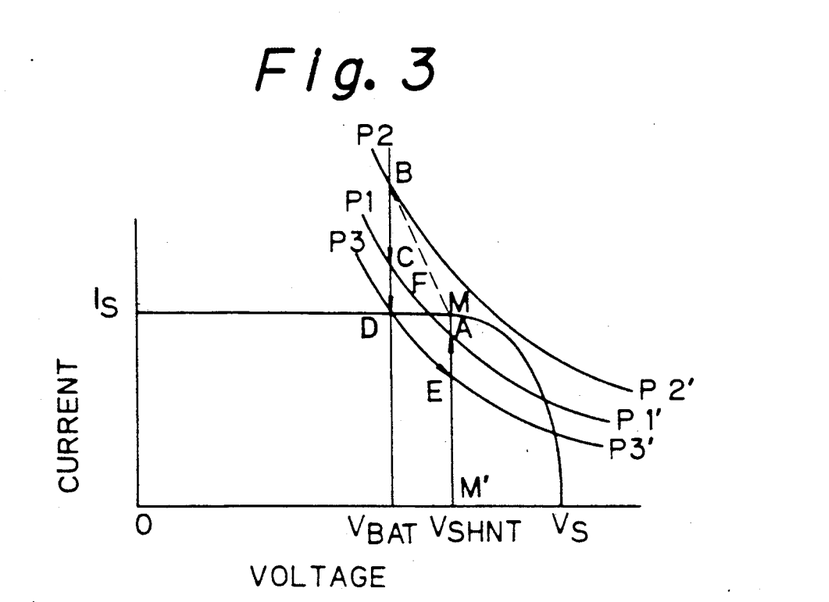
FIG. 3 is a diagram showing the transition of the power operating point when the load fluctuates during a period of sunlight and the transition of the power operating point when solar array bus lockup occurs and is cancelled.

FIG. 3 shows the transition of the power operating point when load fluctuation occurs during a period of sunlight. In FIG. 3, the curve $I_S$-$V_S$ represents the current/voltage characteristic of the power generated by the solar cell 1; $V_{BAT}$ represents the bus voltage value when the storage battery 2 is discharging; and $V_{SHNT}$ represents the value of the regulated bus voltage obtained by the solar-cell surplus-power control effected by the shunt device 6.

The case considered will be that where the power consumption by the load 9 fluctuates when the power consumed by the load 9 is P1 and the operating point is A. As long as the power consumption fluctuates within the range: $V_{SHNT} \times I_S$, the power operating point lies in the straight line M—M' of FIG. 3.

If, however, the power consumption of the load 9 has exceeded the range of $V_{SHNT} \times I_S$, increasing from P1 to P2, it exceeds the power generated by the solar cell 1, so that power compensation is effected by discharge from the storage batter 2. In this case, the power operating point moves from A to M, then to B.

Once it has moved to B, the operating point is not restored to A even if the power consumption of the load 9 is immediately reduced to P1 afterwards; it only moves to the point C. This brings about a state in which the bus voltage is fixed to the voltage of the storage battery 2, and the storage battery 2 continues to discharge, although the solar cell 1 is capable of generating all the power required by the load 9. This phenomenon is called solar array bus lockup.

To cancel solar array bus lockup, the power consumption of the load 9 is temporarily reduced to P3 or less by a command from the ground station, thus shifting the operating point in the order: C, D, E to A.

If solar array bus lockup is left unattended, the storage battery 2 will be allowed to discharge constantly, destroying the balance of power of the storage battery 2 between periods of sunlight and eclipse.

Conventionally, occurrence of solar array bus lockup has been detected in the following manner: first, discharge from the storage battery 2 is confirmed through the telemetry signal $I_{CTLM}$ of the charge/discharge current monitor 12. Then, a computer provided in the ground station performs a calculation using the following values: an engineering transformation $I_{SA}$ of the telemetry signal $I_{SATLM}$ of the solar array current monitor 10, an engineering transformation $I_L$ of the telemetry signal $I_{LTLM}$ of the load current monitor 11, and an engineering transformation $V_{BUS}$ of the telemetry signal $V_{BUSTLM}$ of the bus voltage monitor 13 as well as the regulated bus voltage value $V_{SHNT}$ obtained by the shunt device 6 for the purpose of checking whether the following inequality holds true or not:

$$V_{SHNT} \times I_{SA} > V_{BUS} \times I_L \tag{1}$$

With the conventional method, solar array bus lockup is judged to have been brought about if the inequality (1) holds true.

This method, however, can only be used when communication is always possible between the satellite and the ground station, as in the case of a geostationary satellite. A satellite in a relatively low earth orbit, is in a state for a considerable length of time when no communication with the ground station is possible, if solar array bus lockup occurs during such a period, the above method cannot be used until communication with the ground station again becomes possible. Accordingly, under these circumstances prompt cancellation of solar array bus lockup cannot be effected.

It is an object of this invention to provide a solar cell power system having a solar array bus lockup cancelling mechanism which is adapted to automatically detect the occurrence of solar array bus lockup and cancel it.

SUMMARY OF THE INVENTION

In accordance with this invention, the above object is achieved by means of a solar cell power system with a solar array bus lockup cancelling mechanism, comprising: a common return line; a solar cell means having an output terminal and a terminal connected to the return line; a shunt device connected in parallel between the output terminal of the solar cell means and the return line; a power bus; a first unilateral current transmission means which has an input terminal connected to the output terminal of the solar cell means and an output terminal connected to the power bus and which allows a current to flow only from the output terminal of the solar cell means toward the power bus; a storage battery means having an output terminal and a terminal connected to the return line; a charging means connected to the power bus and the output terminal of the storage battery means in series with the storage battery means; a second unilateral current transmission means which has an input terminal connected to the output terminal of the storage battery means and an output terminal connected to the power bus and which allows a current to flow only from the output terminal of the power storage means toward the power bus; a charge storage means connected between the power bus and the return line; a load which has a first terminal connected to the power bus, a second terminal connected to the return line, and a control terminal, the load reducing its own magnitude when a load power reducing signal is supplied to the control terminal; a charge/discharge current monitor means which has an output terminal and which is connected to the storage battery means to monitor the charge/discharge current that charges the storage battery means or that is discharged therefrom, emitting through the output terminal a signal representing the charge/discharge current thus monitored; a bus voltage monitor means which has an output terminal and which is inserted between the power bus and the return line to monitor the bus voltae in the power bus, emitting through the output terminal a signal representing the bus voltage thus monitored; a solar array current monitor means which has an output terminal and which is connected to the first unilateral current transmission means to monitor the solar array current flowing from the first unilateral current transmission means to the power bus, emitting through the output terminal a signal representing the solar array current thus monitored, or a load current monitor means which has an output terminal and which is connected to the load to monitor the load current, emitting through the output terminal a signal representing the load current thus monitored; and a solar array bus lockup determining means which has three input terminals and an output terminal, two of the three input terminals being respectively connected to the output terminal of the charge/discharge current monitor means and the output terminal of the bus voltage monitor means, the remaining one input terminal being connected to either the solar array current monitor means or the load current monitor means, the output terminal being connected to the control terminal of the load, the solar array bus lockup determining means including a reference voltage generating means for generating a reference voltage representing the regulated bus voltage when the solar cell power system is not in the solar array bus lockup state with the bus voltage being regulated by the shunt device, the solar allay bus lockup determining further calculating the effective generated power of the solar cell means and the load power consumed by the load on the basis of the regulated bus voltage, the monitored bus voltage, the monitored discharge current, and either of the monitored solar array current or the monitored load current to generate a load power reducing signal at the output terminal when the effective generated power is greater than the load power.

With the above construction, this solar cell power system detects a state in which, during a period of sunlight, its bus voltage is fixed to the output voltage of the storage battery means and in which discharge from the storage battery means continues even when the solar cell means can manage to supply all the necessary load current, and temporarily reduces the magnitude of the load to restore the state in which the bus voltage is regulated by the shunt device.

In accordance with this invention, the above object is also attained by another type of solar cell power system with a solar array bus lockup cancelling mechanism, comprising: a common return line; a solar cell means having an output terminal and a terminal connected to the return line; a shunt device connected in parallel between the output terminal of the solar cell means and the return line; a power bus; a first unilateral current transmission means which has an input terminal connected to the output terminal of the solar cell means and an output terminal connected to the power bus and which allows a current to flow only from the output terminal of the solar cell means toward the power bus; a storage battery means which has an output terminal and a terminal which is connected to the return line; a charging means which is connected to the power bus and the output terminal of the storage battery means in series with the storage battery means; a second unilateral current transmission means which has an input terminal connected to the output terminal of the storage battery means and an output terminal connected to the power bus and which allows a current to flow only from the output terminal of the power storage means toward the power bus; a charge storage means connected between the power bus and the return line; a load which has a first terminal connected to the power bus, a second terminal connected to the return line; a charge/discharge current monitor means which has an output terminal and which is connected to the storage battery means to monitor the charge/discharge current that charges the storage battery means or that is discharged therefrom, emitting through the output terminal a signal representing the charge/discharge current thus monitored; a bus voltage monitor means which has an output terminal and which is inserted between the power bus and the return line to monitor the bus voltage in the power bus, emitting through output terminal a signal representing the bus voltage thus monitored; a solar array current monitor means which has an output terminal and which is connected to the first unilateral current transmission means to monitor the solar array current flowing from the first unilateral current transmission means to the power bus, emitting through the output terminal a signal representing the solar array current thus monitored, or a load current monitor means which has an output terminal and which is connected to the load to monitor the load current, emitting through the output terminal a signal representing the load current thus monitored; a solar array bus lockup determining means which has three input terminals and an output terminal, two of the three input terminals being respectively connected to the output terminal of the charge/discharge current monitor means and the output terminal of the bus voltage monitor means, the remaining one input terminal being connected to either the output terminal the solar array current monitor means or the output terminal of the load current monitor means, the solar array bus lockup determining means including a reference voltage generating means for generating a reference voltage representing the regulated bus voltage when the system is not in the solar array bus lockup state with the bus voltage being regulated by the shunt device, and calculating the effective generated power of the solar cell means and the load power consumed by the load on the basis of the regulated bus voltage, the monitored bus voltage, the monitored discharge current, and either of the monitored solar array current or the monitored load current to generate a solar array bus lockup signal at the output terminal when the effective generated power is greater than the load power; and a solar array bus lockup cancelling drive means which has an input terminal connected to the output terminal of the storage battery means, an output terminal connected to the power bus, and a control terminal connected to the output terminal of the solar array bus lockup determining means, the solar array bus lockup cancelling drive means responding to the solar array bus lockup signal to accumulate for a predetermined time solar array bus lockup cancelling drive energy supplied from the storage battery means and to discharge the solar array bus lockup cancelling drive energy to the power bus after the predetermined time has elapsed.

With the above construction, this solar cell power system is capable of being restored from a state in which, during a period of sunlight, its bus voltage is fixed to the output voltage of the power storage means and in which discharge from the storage battery means continues even though the solar cell means can manage to supply all the load current, to the state in which the bus voltage is regulated by the shunt device without temporarily reducing the magnitude of the load.

The above and other objects and features of this invention will be apparent from the following description taken in connection with the accompanying drawings.

BRIEF DESCRIPTION OF THE DRAWINGS

In the drawings, the same reference numerals indicate the same or equivalent components.

DESCRIPTION OF THE PREFERRED EMBODIMENTS

Figure 4:
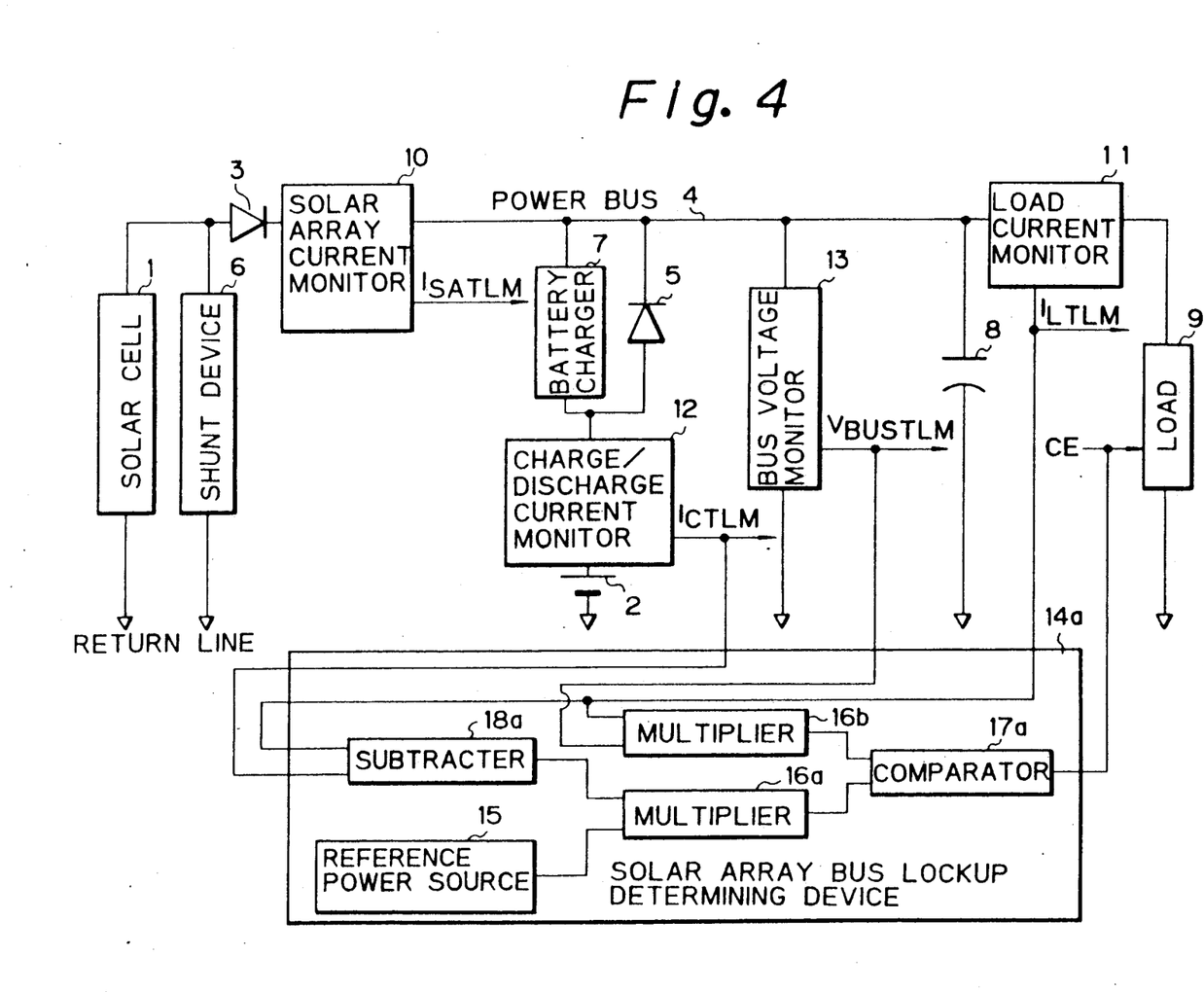
FIG. 4 is a diagram showing the construction of the first embodiment of the solar cell power system with a solar array bus lockup cancelling mechanism in accordance with this invention.

FIG. 4 shows the construction of a first embodiment of the solar cell power system with a solar array bus lockup cancelling mechanism in accordance with this invention. In the drawing, the elements 1 to 13 are identical with those of the conventional system described with reference to FIG. 1, so that a description thereof will be omitted here. The reference numeral 14a indicates a solar array bus lockup determining device, which is connected to a charge/discharge current monitor 12, a bus voltage monitor 13, a load current monitor 11 and a load 9. This solar array bus lockup determining device 14a is composed of a reference power source 15, a first multiplier 16a, a second multiplier 16b, a comparator 17a and a subtracter 18a.

In the following, this solar array bus lockup determining device 14a will be described in detail.

The subtracter 18a is connected to the telemetry output terminal of the load current monitor 11 and the telemetry output terminal of the charge/discharge current monitor 12, subtracting the telemetry $I_{CTLM}$ of the charge/discharge current monitor 12 from the telemetry $I_{LTLM}$ of the load current monitor 11 and transmitting the result ($I_{LTLM} - I_{CTLM}$) to the first multiplier 16a. This first multiplier 16a is connected to the output terminal of the subtracter 18a and the output terminal of the reference power source 15 where it multiplies the output of the subtracter 18a ($I_{LTLM} - I_{CTLM}$) by the output $V_{REF}$ of the reference power source 15, supplying a signal $P_{S1}$ to the comparator 17a.

The second multiplier 16b is connected to the output terminal of the bus voltage monitor 13 and the telemetry output terminal of the load current monitor 11 and multiplies the output $V_{BUSTLM}$ of the bus voltage monitor 13 by the telemetry $I_{LTLM}$ of the load current monitor 11, supplying a signal $P_{L1}$ to the comparator 17a.

The comparator 17a compares the output $P_{S1}$ of the first multiplier 16a with the output $P_{L1}$ of the second multiplier 16b, and when the condition:

$$P_{S1} > P_{L1} \quad (2)$$

is attained, supplies a load power reducing signal to the load 9.

The input signals $I_{LTLM}$, $I_{CTLM}$, $V_{BUSTLM}$ and $V_{REF}$, which are supplied to the subtracter 18a, the first multiplier 16a and the second multiplier 16b, are respectively related in the following manner to the actual load current $I_L$, the discharge current $I_D$ of the storage battery 2, the bus voltage $V_{BUS}$, and the regulated bus voltage $V_{SHNT}$ obtained by the shunt device 6:

$$I_{LTLM} = K_1 \cdot I_L \quad (3)$$

$$I_{CTLM} = K_1 \cdot I_D \quad (4)$$

$$V_{BUSTLM} = K_2 \cdot V_{BUS} \quad (5)$$

$$V_{REF} = K_2 \cdot V_{SHNT} \quad (6)$$

In equations (3) to (5), $K_1$ and $K_2$ are constant transformation coefficients used when transforming the actual current levels or voltage levels to telemetries. The output $V_{REF}$ of the reference power source 15 is set in such a manner that it satisfies equation (6).

The input signals $P_{S1}$ and $P_{L1}$ to be supplied to the comparator 17a can be obtained from equations (3) to (6) as follows:

$$P_{S1} = K_1 \cdot K_2 \cdot V_{SHNT}(I_L - I_D) \quad (7)$$

$$P_{L1} = K_1 \cdot K_2 \cdot V_{BUS} \cdot I_L \quad (8)$$

In equation (7), ($I_L - I_D$) is obtained by subtracting the discharge current of the storage battery 2 from the actual load current, so that, in the solar array bus lockup condition, its value is equal to the actual solar array current $I_{SA}$ that actually flows from the solar cell 1 into the power bus 4.

That is, in the solar array bus lockup condition, $P_{S1}$ indicates a value equivalent to the effective generated power of the solar cell 1 and $P_{L1}$ indicates a value equivalent to the load power of the load 9.

In consideration of the above, equations (7) and (8) may be substituted in equation (2) and $I_L - I_D$ may be replaced by $I_{SA}$, thereby obtaining equation (1), which is none other than the criterion for solar array bus lockup.

Thus, when solar array bus lockup has occurred, the condition of equation (2) holds true. As a result, a load power reducing signal is transmitted from the comparator 17a to the load 9, reducing the magnitude of the load automatically. When the magnitude of the load has been reduced and the solar array bus lockup state cancelled, the discharge of the storage battery 2 is stopped and the bus voltage becomes $V_{SHNT}$, so that the condition shown in equation (2) does not hold true any longer, and the emission of the load power reducing signal from the comparator 17a is stopped.

Figure 5:
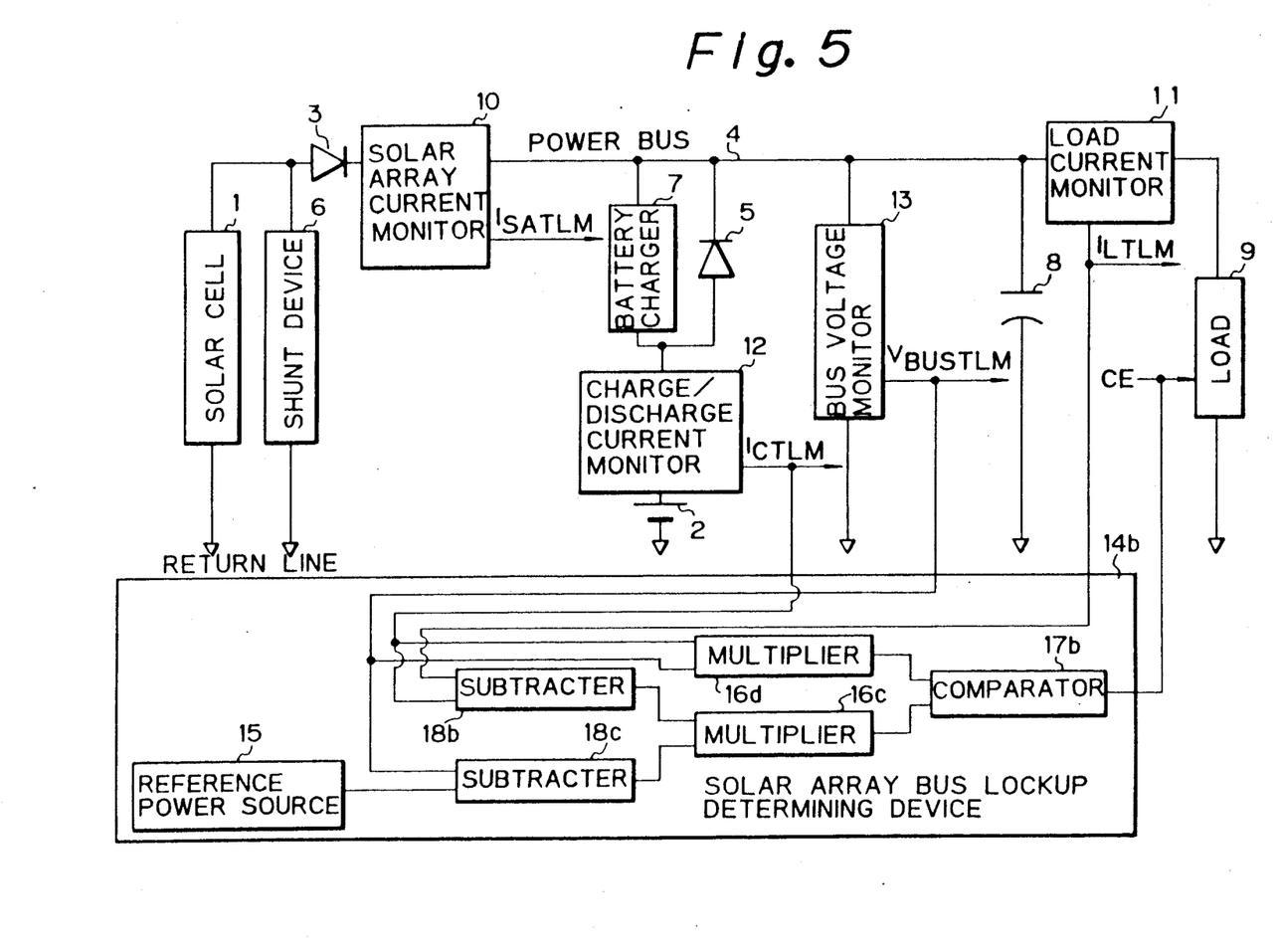
FIG. 5 is a diagram showing the construction of the second embodiment of the solar cell power system with a solar array bus lockup cancelling mechanism in accordance with this invention.

FIG. 5 shows the construction of a second embodiment of the solar cell power system with a solar array bus lockup cancelling mechanism in accordance with this invention. In the drawing, the elements 1 to 13 are identical with those of the conventional system described with reference to FIG. 1, so that a description thereof will be omitted here. The reference numeral 14b indicates a solar array bus lockup determining device, which is connected to a charge/discharge current monitor 12, a bus voltage monitor 13, a load current monitor 11 and a load 9. This solar array bus lockup determining device 14b is composed of a reference power source 15, a first multiplier 16c, a second multiplier 16d, a comparator 17b, a first subtracter 18b and a second subtracter 18c.

In the following, this solar array bus lockup determining device 14b will be describe in detail.

The first subtracter 18b is connected to the telemetry output terminal of the load current monitor 11 and the telemetry output terminal of the charge/discharge current monitor 12, subtracting the telemetry $I_{CTLM}$ of the charge/discharge current monitor 12 from the telemetry $I_{LTLM}$ of the load current monitor 11 and transmitting the result ($I_{LTLM} - I_{CTLM}$) to the first multiplier 16c.

The second subtracter 18c is connected to the telemetry output terminal of the bus voltage monitor 13 and the output terminal of the reference power source 15, subtracting the telemetry output $V_{BUSTLM}$ of the bus voltage monitor 13 from the output $V_{REF}$ of the reference power source 15 and transmitting the result ($V_{REF} - V_{BUSTLM}$) to the first multiplier 16c.

The first multiplier 16c is connected to the output terminal of the first substracter 18b and the output terminal of the output terminal of the second subtracter 18c and multiplies the output ($I_{LTLM} - I_{CTLM}$) of the first subtracter 18b by the output ($V_{REF} - V_{BUSTLM}$) of the second subtracter 18c, supplying a signal $P_{12}$ to the comparator 17b.

The second multiplier 16d is connected to the telemetry output terminal of the bus voltage monitor 13 and the telemetry output terminal of the charge/discharge current monitor 12 and multiplies the output $V_{BUSTLM}$ of the bus voltage monitor 13 by the telemetry $I_{CTLM}$ of the charge/discharge current monitor 12, supplying a signal $P_{B2}$ to the comparator 17b.

The comparator 17b compares the output $P_{I1}$ of the first multiplier 16c with the output $P_{B1}$ of the second multiplier 16d, and when the condition:

$$P_{f1} > P_{B1} \tag{9}$$

is attained, supplies a load power reducing signal to the load 9.

The input signals $I_{LTLM}$, $I_{CTLM}$, $V_{BUSTLM}$ and $V_{REF}$, which are applied to the first substracter 18b, the second subtracter 18c and the second multiplier 16d, are respectively related in the following manner to the actual load current $I_L$, the discharge current $I_D$ of the storage battery 2, the bus voltage $V_{BUS}$, and the regulated bus voltage $V_{SHNT}$ obtained by the shunt device 6:

$$I_{LTLM} = K_1 \cdot I_L \tag{10}$$

$$I_{CTLM} = K_1 \cdot I_D \tag{11}$$

$$V_{BUSTLM} = K_2 \cdot V_{BUS} \tag{12}$$

$$V_{REF} = K_2 \cdot V_{SHNT} \tag{13}$$

In equations (10) to (12), $K_1$ and $K_2$ are constant transformation coefficients used when transforming the actual current levels or voltage levels to telemetries. The output $V_{REF}$ of the reference power source 15 is set in such a manner that it satisfies equation (13).

The input signals $P_{l1}$ and $P_{B1}$ to be supplied to the comparator 17b can be obtained from equations (10) to (13) as follows:

$$P_{f1} = K_1 \cdot K_2 \cdot (V_{SHNT} - V_{BUS}) \cdot (I_L - I_D) \tag{14}$$

$$P_{B1} = K_1 \cdot K_2 \cdot V_{BUS} \cdot I_D \tag{15}$$

In equation (14), $(I_L - I_D)$ is obtained by subtracting the discharge current of the storage batter 2 from the actual load current, so that, in the solar array bus lockup condition, it is equal to the solar array current $I_{SA}$ that actually flows from the solar cell 1 into the power bus 4.

That is, in the solar array bus lockup condition, $P_{f1}$ indicates a value equivalent to the potential generated power of the solar cell 1 and $P_{B2}$ indicates a value equivalent to the discharge power of the storage battery 2.

In consideration of the above, equations (14) and (15) may be substituted in equation (9) and $K_1 \cdot K_2 \cdot V_{BUS} \cdot (I_L - I_D)$ may be added to both sides, thereby obtaining equation (1), which is none other than the criterion for solar array bus lockup.

Thus, when solar array bus lockup has occurred, the condition shown in equation (9) holds true. As a result, a load power reducing signal is transmitted from the comparator 17b to the load 9, reducing the magnitude of the load automatically. When the magnitude of the load has been reduced and the solar array bus lockup state cancelled, the discharge from the storage battery 2 is stopped and the bus voltage becomes $V_{SHNT}$, so that the condition shown in equation (9) does not hold true any longer, which stops the emission of the load power reducing signal from the comparator 17b.

Figure 6:
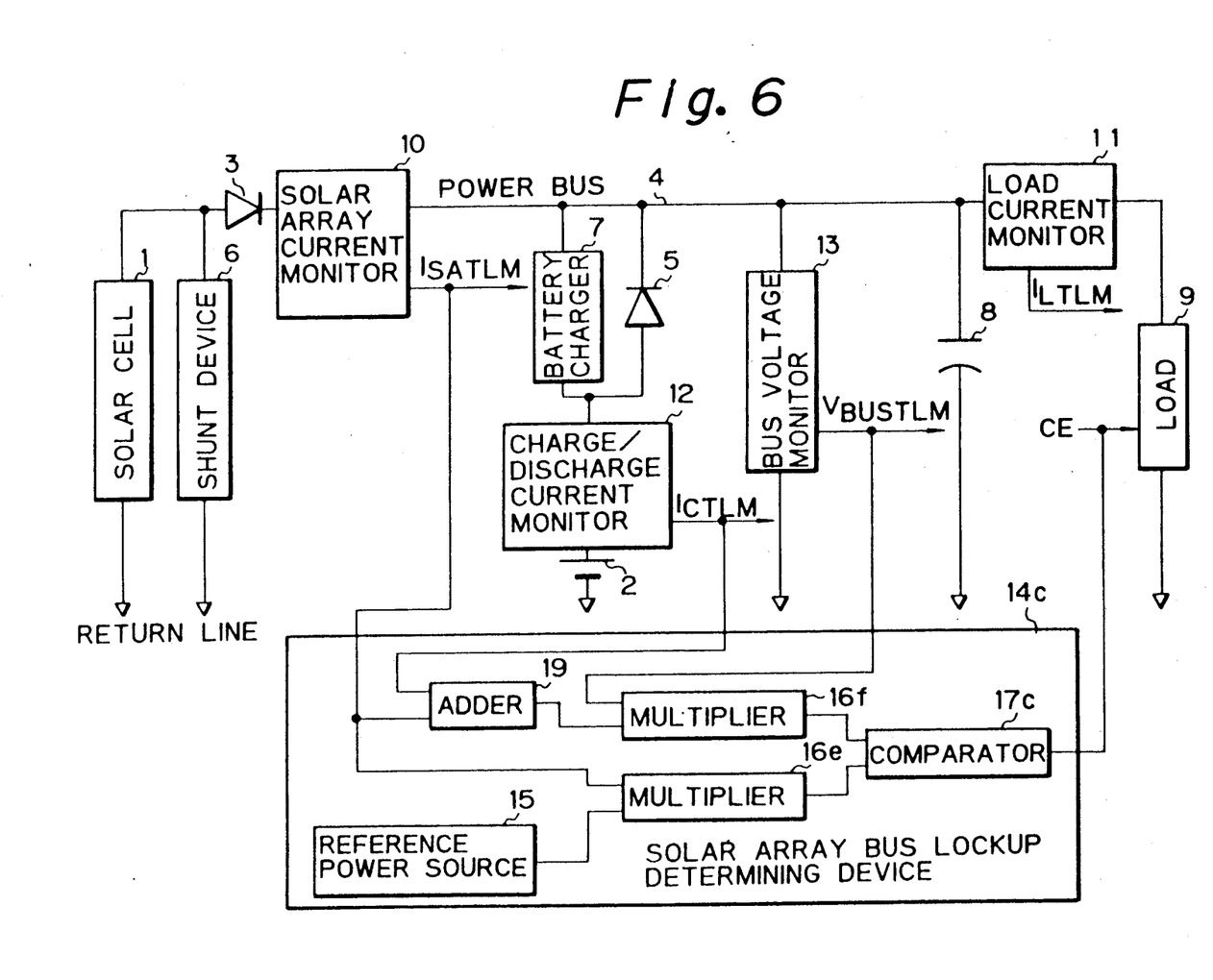
FIG. 6 is a diagram showing the construction of the third embodiment of the solar cell power system with a solar array bus lockup cancelling mechanism in accordance with this invention.

FIG. 6 shows the construction of a third embodiment of the solar cell power system with a solar array bus lockup cancelling mechanism in accordance with this invention. In the drawing, the elements 1 to 13 are identical with those of the conventional system described with reference to FIG. 1, so that a description thereof will be omitted here. The reference numeral 14c indicates a solar array bus lockup determining device, which is connected to a solar array current monitor 10, a charge/discharge current monitor 12, a bus voltage monitor 13 and a load 9. This solar array bus lockup determining device 14c is composed of a reference power source 15, a first multiplier 16e, a second multiplier 16f, a comparator 17c, and an adder 19.

In the following, this solar array bus lockup determining device 14c will be described in detail.

The first multiplier 16e is connected to the telemetry output terminal of the solar array current monitor 10 and the output terminal of the reference power source 15, where it multiplies the telemetry $I_{SATLM}$ of the solar array current monitor 10 by the output $V_{REF}$ of the reference power source 15, transmitting a signal $P_{S2}$ to the comparator 17c.

The adder 19 is connected to the telemetry output terminal of the solar array current monitor 10 and the telemetry output terminal of the charge/discharge current monitor 12, adding the telemetry $I_{SATLM}$ of the solar array current monitor 10 to the telemetry $I_{CTLM}$ of the charge/discharge current monitor 12 and transmitting the result $(I_{SATLM} + I_{CTLM})$ to the second multiplier 16f. The second multiplier 16f is connected to the output terminal of the adder 19 and the telemetry output terminal of the bus voltage monitor 13 and multiplies the output $(I_{SATLM} + I_{CTLM})$ of the adder 19 by the output $V_{BUSTLM}$ of the bus voltage monitor 13, supplying a signal $P_{L2}$ to the comparator 17c.

The comparator 17c compares the output $P_{S2}$ of the first multiplier 16e with the output $P_{L2}$ of the second multiplier 16f, and when the condition:

$$P_{S2} > P_{L2} \tag{16}$$

is attained, supplies a load power reducing signal to the load 9.

The input signals $V_{REF}$, $I_{SATLM}$, $I_{CTLM}$ and $V_{BUSTLM}$, which are supplied to the first multiplier 16e, the adder 19 and the second multiplier 16f, are respectively related in the following manner to the actual regulated bus voltage $V_{SHNT}$ obtained by the shunt device 6, the solar array current $I_{SA}$, the discharge current $I_D$ of the storage battery 2 and the bus voltage $V_{BUS}$:

$$I_{SATLM} = K_1 \cdot I_{SA} \tag{17}$$

$$I_{CTLM} = K_1 \cdot I_D \tag{18}$$

$$V_{BUSTLM} = K_2 \cdot V_{BUS} \tag{19}$$

$$V_{REF} = K_2 \cdot V_{SHNT} \tag{20}$$

In equations (17) to (19), $K_1$ and $K_2$ are constant transformation coefficients that are used when transforming the actual current levels or voltage levels to telemetries. The output $V_{REF}$ of the reference power source 15 is set in such a manner that it satisfies equation (20).

The input signals $P_{S2}$ and $P_{L2}$ to be supplied to the comparator 17c can be obtained from equations (17) to (20) as follows:

$$P_{S2} = K_1 \cdot K_2 \cdot V_{SHNT} \cdot I_{SA} \tag{21}$$

$$P_{L2} = K_1 \cdot K_2 \cdot V_{BUS} \cdot (I_{SA} + I_D) \tag{22}$$

In equation (22), $(I_{SA} + I_D)$ is obtained by adding the discharge current of the storage battery 2 to the actual solar array current, so that, in the solar array bus lockup condition, it is equal to the actual load current $I_L$ that flows from the power bus 4 to the load 9.

That is, in the solar array bus lockup condition, $P_{S2}$ indicates a value equivalent to the effective generated power of the solar cell 1 and $P_{L2}$ indicates a value equivalent to the load power of the load 9.

In consideration of the above, equations (21) and (22) may be substituted in equation (16) and $I_{SA}+I_D$ may replaced by $I_L$, thereby obtaining equation (1), which is none other than the criterion for solar array bus lockup.

Thus, when solar array bus lockup has occurred, the condition shown in equation (16) holds true. As a result, a load power reducing signal is transmitted from the comparator 17c to the load 9, automatically reducing the magnitude of the load. When the magnitude of the load has been reduced and the solar array bus lockup state cancelled, the discharge of the storage battery 2 is stopped and the bus voltage becomes $V_{SHNT}$, so that the condition shown in equation (16) does not hold true any longer, and the emission of the load power reducing signal from the comparator 17c is stopped.

Figure 7:
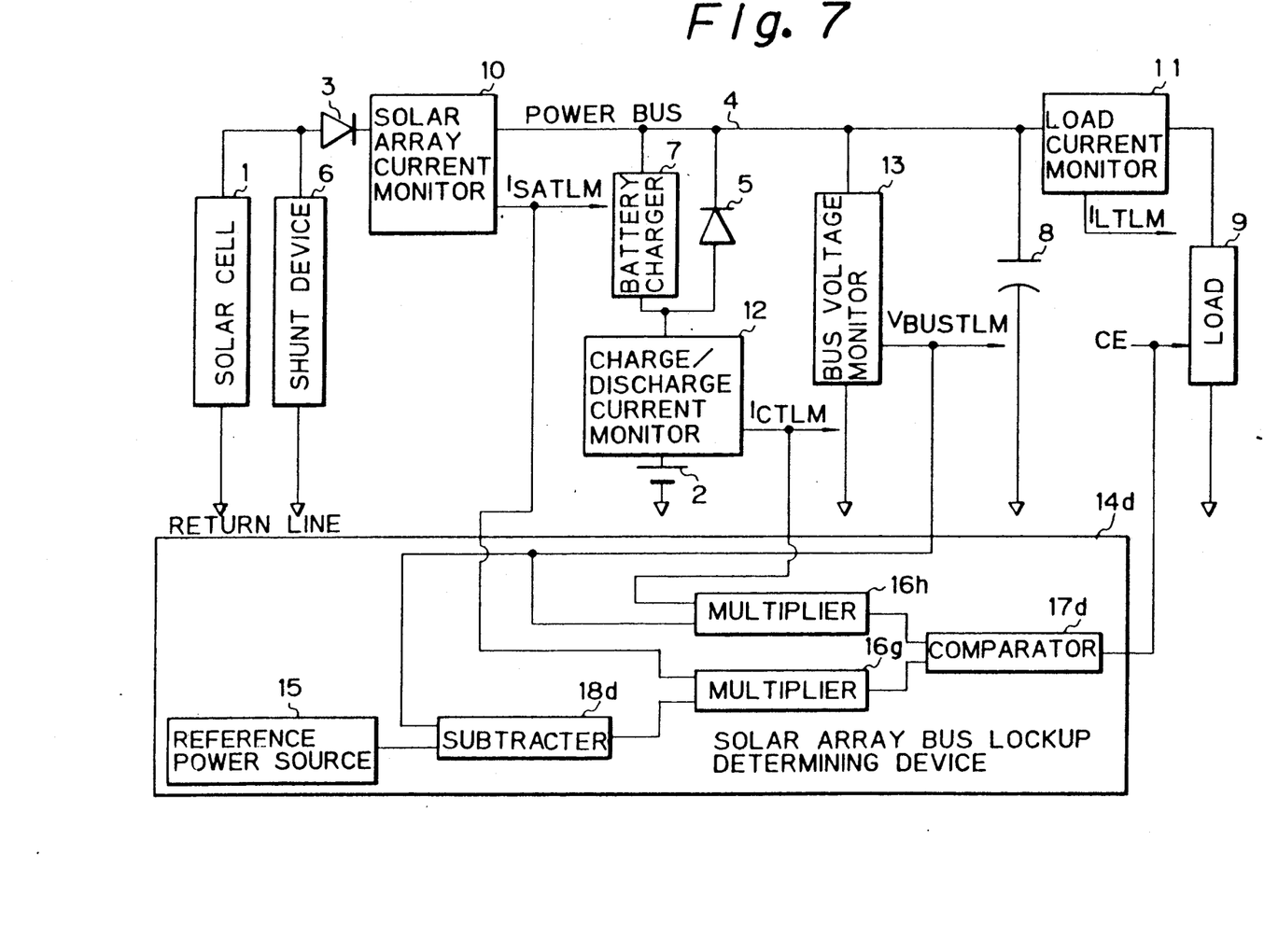
FIG. 7 is a diagram showing the construction of the fourth embodiment of the solar cell power system with a solar array bus lockup cancelling mechanism in accordance with this invention.

FIG. 7 shows the construction of a fourth embodiment of the solar cell power system with a solar array bus lockup cancelling mechanism in accordance with this invention. In the drawing, the elements 1 to 13 are identical with those of the conventional system described with reference to FIG. 1, so that a description thereof will be omitted here. The reference numeral 14d indicates a solar array bus lockup determining device, which is connected to a solar array current monitor 10, a charge/discharge current monitor 12, a bus voltage monitor 13 and a load 9. This solar array bus lockup determining device 14d is composed of a reference power source 15, a first multiplier 16g, a second multiplier 16h, a comparator 17d, and a subtracter 18d.

In the following, this solar array bus lockup determining device 14d will be described in detail.

The subtracter 18d is connected to the output terminal of the reference power source 15 and the telemetry output terminal of the bus voltage monitor 13 and subtracts the telemetry output $V_{BUSTLM}$ of the voltage monitor 13 from the output $V_{REF}$ of the reference power source 15, transmitting the result ($V_{REF}-V_{BUSTLM}$) to the first multiplier 16g.

The first multiplier 16g is connected to the output terminal of the subtracter 18d and the output terminal of the solar array current monitor 10 and multiplies the output ($V_{REF}-V_{BUSTLM}$) of the subtracter 18d by the output $I_{SATLM}$ of the solar array current monitor 10, supplying a signal $P_{I2}$ to the comparator 17d.

The second multiplier 16h is connected to the telemetry output terminal of the bus voltage monitor 13 and the telemetry output terminal of the charge/discharge current monitor 12 and multiplies the output $V_{BUSTLM}$ of the bus voltage monitor 13 by the output $I_{CTLM}$ of the charge/discharge current monitor 12, supplying a signal $P_{B2}$ to the comparator 17d.

The comparator 17d compares the output $P_{I2}$ of the first multiplier 16g with the output $P_{B2}$ of the second multiplier 16h, and when the condition:

$$P_{I2} > P_{B2} \tag{23}$$

is attained, supplies a load power reducing signal to the load 9.

The input signals $V_{REF}$, $I_{SATLM}$, $I_{CTLM}$ and $V_{BUSTLM}$, which are supplied to the subtracter 18d, the first multiplier 16g and the second multiplier 16h, are respectively related in the following manner to the actual regulated bus voltage $V_{SHNT}$ obtained by the shunt device 6, the solar array current $I_{SA}$, the discharge current $I_D$ of the storage battery 2 and the bus voltage $V_{BUS}$:

$$I_{SATLM} = K_1 \cdot I_{SA} \tag{24}$$

$$I_{CTLM} = K_1 \cdot I_D \tag{25}$$

$$V_{BUSTLM} = K_2 \cdot V_{BUS} \tag{26}$$

$$V_{REF} = K_2 \cdot V_{SHNT} \tag{27}$$

In equations (24) to (26), $K_1$ and $K_2$ are constant transformation coefficients that are used when transforming the actual current levels or voltage levels to telemetries. The output $V_{REF}$ of the reference power source 15 is set in such a manner that it satisfies equation (27).

The input signals $P_{I2}$ and $P_{B2}$ to be supplied to the comparator 17d can be obtained from equations (24) to (27) as follows:

$$P_{I2} = K_1 \cdot K_2 \cdot (V_{SHNT} - V_{BUS}) \cdot I_{SA} \tag{28}$$

$$P_{B2} = K_1 \cdot K_2 \cdot V_{BUS} \cdot I_D \tag{29}$$

That is, in the solar array bus lockup condition, $P_{I2}$ indicates a value equivalent to the potential generated power of the solar cell 1 and $P_{B2}$ indicates a value equivalent to the discharge power of the storage battery 2.

In the solar array bus lockup condition, the following relationship is established between the solar array current $I_{SA}$, the discharge current $I_D$ of the storage battery 2 and the load current $I_L$:

$$I_{SA} = I_L - I_D \tag{30}$$

In consideration of the above equation (30), equations (28) and (29) may be substituted in equation (23) and $K_1 \cdot K_2 \cdot V_{BUS} \cdot (I_L - I_D)$ may be added to both sides, thereby obtaining equation (1), which is none other than the criterion for solar array bus lockup.

Thus, when solar array bus lockup has occurred, the condition shown in equation (23) holds true. As a result, a load power reducing signal is transmitted from the comparator 17d to the load 9, automatically reducing the magnitude of the load. When the magnitude of the load has been reduced and the solar array bus lockup state cancelled, the discharge of the storage battery 2 is stopped and the bus voltage becomes $V_{SHNT}$, so that the condition shown in equation (23) does not hold true any longer, which stops the emission of the load power reducing signal from the comparator 17d.

As described above, the solar array bus lockup determining device 14a of the first embodiment is composed of one reference power source 15, two multipliers 16a, 16b, one comparator 17a, and one subtracter 18a, utilizing, as input data, the respective telemetries of the load current monitor 11, the charge/discharge current monitor 12 and the bus voltage monitor 13 of the solar cell power system. The solar array bus lockup determining device 14b of the second embodiment is composed of one reference power source 15, two multipliers 16c, 16d, one comparator 17b, and two subtracters 18b, 18c, utilizing, as input data, the respective telemetries of the load current monitor 11, the charge/discharge current monitor 12 and the bus voltage monitor 13 of the solar cell power system. The solar array bus lockup determining device 14c of the third embodiment is composed of one reference power source 15, two multipliers 16e, 16f, one comparator 17c, and one adder 19, utilizing, as input data, the respective telemetries of the solar array current monitor 10, the charge/discharge current monitor 12 and the bus voltage monitor 13 of the solar cell power system. The solar array bus lockup determining device 14d of the fourth embodiment is composed of one reference power source 15, two multipliers 16g, 16h, one comparator 17d, and one subtracter 18d, utilizing, as input data, the respective telemetries of the solar array current monitor 10, the charge/discharge current monitor 12 and the bus voltage monitor 13 of the solar cell power system. When solar array bus lockup has occurred, these solar array bus lockup determining devices 14a to 14d supply a load power reducing signal to the load 9 to control the magnitude of the load, thereby determining the occurrence of solar array bus lockup automatically and cancelling it without causing the function of the load to be lost for a long period or depending on support from a ground station.

In the first to the fourth embodiment described above, a solar array bus lockup cancelling mechanism in accordance with this invention is incorporated into a solar cell power system whose load 9 can be reduced. In some cases, however, the load 9 cannot be reduced.

Figure 8:
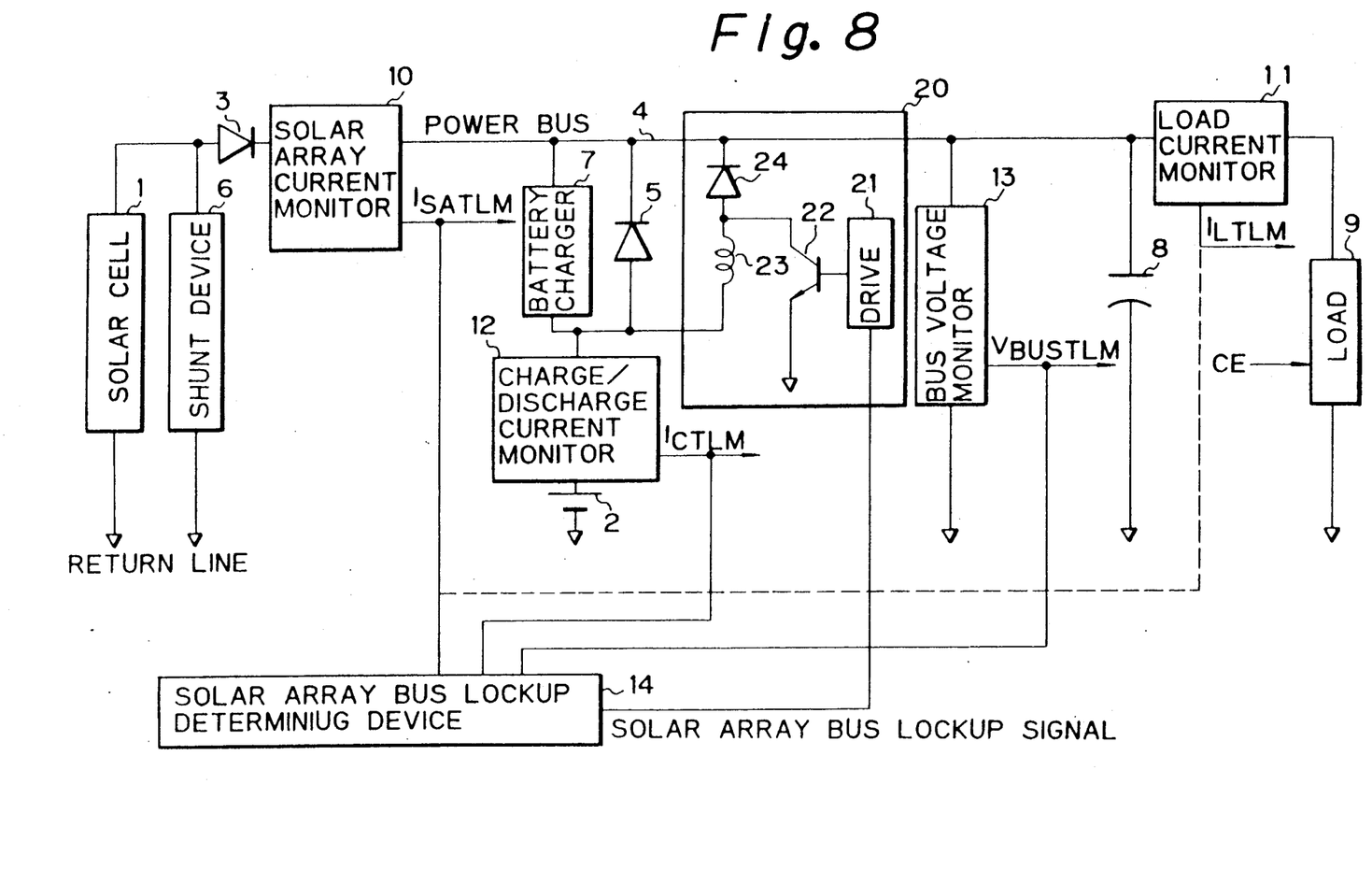
FIG. 8 is a diagram showing the construction of the fifth embodiment of the solar cell power system with a solar array bus lockup cancelling mechanism in accordance with this invention.

FIG. 8 shows the construction of a fifth embodiment of this invention in which a solar array bus lockup cancelling mechanism in accordance with this invention is incorporated into a solar cell power system of the type in which load reduction is impossible or in which from the operational viewpoint, it is preferable, not to reduce the load. In the drawing, the elements 1 to 13 are identical with those of the conventional system described with reference to FIG. 1, so that an explanation thereof will be omitted here. The load 9 may consist of a fixed load since it naturally operates as such. The solar array bus lockup determining device 14 of this embodiment is identical with the solar array bus lockup determining device 14c shown in FIG. 6 or the solar array bus lockup determining device 14d shown in FIG. 7. The reference numeral 20 indicates a solar array bus lockup cancelling drive device, which is composed of a drive 21, a transistor 22, a coil 23 and a third diode 24.

In the following, this solar array bus lockup cancelling drive device 20 will be described in detail.

The drive 21 is connected to the output terminal of the solar array bus lockup determining device 14 through which a solar array bus lockup signal is emitted (more specifically, the output terminal of the comparator 17c shown in FIG. 6 or of the comparator 17d shown in FIG. 7) and, is connected to the base of the transistor 22. The emitter of the transistor 22 is connected to the RTN and the collector thereof is connected to the node between the coil 23 and the anode of the third diode 24. The other end of the coil 23, which is not connected to the diode 24, is connected to the node between the anode of the second diode 5 and the charge/discharge current monitor 12. The cathode of the third diode 24 is connected to the power bus 4.

When solar array bus lockup occurs, the drive 21 receives a solar array bus lockup signal from the solar array bus lockup determining device 14 and responds to this signal to drive the base of the transistor 22 to cause the transistor 22 to be conducted for a certain period $T_{ON}$, short-circuiting its collector.

Here, the following relationship exists between the solar array current $I_{SA}$, the voltage $V_{BAT}$ of the storage battery 2, the current $I_{DO}$ supplied from the storage battery 2 to the power bus 4 through the charge/discharge current monitor 12 and the second diode 5, the current $I_{DL}$ flowing from the storage battery 2 through the charge/discharge current monitor 12, the coil 23 and the transistor 22, the short-circuit period $T_{ON}$ of the transistor 22, the load power P1, the inductance L of the coil 23, and the energy $W_L$ stored in the coil 23:

$$P1 = V_{BAT} \cdot (I_{SA} + I_{DO}) \quad (31)$$

$$I_{DL} = \frac{V_{BAT}}{L} \cdot T_{ON} \quad (32)$$

$$W_L = \frac{1}{2} \cdot \frac{V_{BAT}^2}{L} \cdot T_{ON}^2 \quad (33)$$

When the transistor 22 has been opened, the energy $W_L$ stored in the coil 23 is supplied to the power bus 4 through the third diode 24. If $T_{ON}$ and L are selected such that the current $I_{DL}$ which the coil 23 supplies to the power bus is greater than $I_{DO}$, the capacitor bank 8 begins to be charged with a current "$I_{DL} - I_{DO}$" and the bus voltage $V_{BUS}$ increases. As a result, the power operating point of FIG. 3 moves from point C (which, as described with reference to the prior art, is the operating point when the power consumption is increased from P1 to P2 and then reduced to P1) to the point F. As a result of the increase of $V_{BUS}$, the power supply $P_{SA}$ from the solar array increases as follows:

$$P_{SA} = V_{BUS} \cdot I_{SA} \quad (34)$$

Thus, supposing the time t at which the transistor 22 has become open is 0, $V_{BUS}$ continues to increase, as indicated by equations (33) and (34), as long as there exists, after the opening of the transistor 22, the following energy relationship between the solar array power supply $P_{SA}$, the accumulated energy $W_L$ of the coil 23 and the load power P1:

$$W_L + \int_0^t P_{SA} > P1 \cdot t \quad (35)$$

and thus the power operating point of FIG. 3 moves from C to F, then to A. When $V_{BUS}$ has become higher than the power operating point F of FIG. 3 by even the slightest degree, the power P1 to be supplied to the load 9 can be provided solely by the power "$V_{BUS} \cdot I_{SA}$" from the solar cell 1 consisting of a solar array and, due to the surplus power control effected by the shunt device 6, the power operating point of FIG. 3 moves to the point A in the line M—M′, thus releasing the system from the solar array bus lockup state.

Thus, by adjusting the inductance L of the coil 23 and the short-circuiting time $T_{ON}$ of the transistor 22 and accumulating in the coil 23 energy that increases $V_{BUS}$ to or beyond the power operating point F of FIG. 3, the system can be automatically released from the solar array bus lockup state without reducing the load 9.

As described above, the solar array bus lockup cancelling device of the fifth embodiment operates as follows: when the load current temporarily becomes greater than the power generated by the solar cell 1 so that the bus voltage is fixed to the voltage of the storage battery 2, a solar array bus lockup signal emitted from the solar array bus lockup determining device 14 is supplied to the drive 21 of the solar array bus lockup cancelling drive device 20, which causes the transistor 22 to be short-circuited for a certain period with the result that energy is accumulated in the coil 23. The energy accumulated in the coil 23 charges the capacitor bank 8 through the third diode 24, causing the bus voltage to increase. As a result, the bus voltage is restored to a voltage which is at the level when the power supply to the load 9 is performed solely with the output power of the solar cell 1 while being regulated by the shunt device 6. Accordingly, the solar array bus lockup state can be cancelled without reducing the magnitude of the load.

Instead of the solar array current, the load current may be used for the purpose of determining the occurrence of solar array bus lockup, as in the first and second embodiments. In that case, the solar array bus lockup determining device 14 of FIG. 8 may consist of the solar array bus lock-up determining device 14a or 14b shown in FIG. 4 or FIG. 5, with the telemetry $I_{LTLM}$ from the load current monitor 11 being received by the device 14, as indicated by the broken line of FIG. 8, instead of $I_{SATLM}$ from the solar array current monitor 10.

Although the invention has been described in detail with reference to some of its embodiments, it is to be understood that the scope of the invention is not limited to the above description. It should be obvious that various changes and modifications may be made by those skilled in the art without departing from the scope and spirit of the invention.

What is claimed is:

1. A solar cell power system with a solar array bus lockup cancelling mechanism, comprising:

a common return line;

a solar cell means having an output terminal and a terminal connected to said return line;

a shunt device connected in parallel between the output terminal of said solar cell means and said return line;

a power bus;

a first unilateral current transmission means which has an input terminal connected to the output terminal of said solar cell means and an output terminal connected to said power bus and which allows a current to flow only from the output terminal of said solar cell means toward said power bus;

a storage battery means having an output terminal and a terminal connected to said return line;

a charging means connected to said power bus and the output terminal of said storage battery means in series with said storage battery means;

a second unilateral current transmission means which has an input terminal connected to the output terminal of said storage battery means and an output terminal connected to said power bus and which allows a current to flow only from the output terminal of said storage battery means toward said power bus;

a charge storage means connected between said power bus and said return line;

a load which has a first terminal connected to said power bus, a second terminal connected to said return line, and a control terminal, said load reducing its own magnitude when a load power reducing signal is supplied to said control terminal;

a charge/discharge current monitor means which has an output terminal and which is connected to said storage battery means to monitor the charge/discharge current that charges said storage battery means or that is discharged therefrom, emitting through said output terminal a signal representing the charge/discharge current thus monitored;

a bus voltage monitor means which has an output terminal and which is inserted between said power bus and said return line to monitor the bus voltage in said power bus, emitting through said output terminal a signal representing the bus voltage thus monitored;

a solar array current monitor means which has an output terminal and which is connected to said first unilateral current transmission means to monitor the solar array current flowing from said first unilateral current transmission means to said power bus, emitting through said output terminal a signal representing the solar array current thus monitored, or a load current monitor means which has an output terminal and which is connected to said load to monitor the load current, emitting through said output terminal a signal representing the load current thus monitored; and a solar array bus lockup determining means which has three input terminals and an output terminal, two of said three input terminals being respectively connected to the output terminal of said charge/discharge current monitor means and the output terminal of said bus voltage monitor means, the remaining one input terminal being connected to either said solar array current monitor means or said load current monitor means, said output terminal being connected to said control terminal of said load, said solar array bus lockup determining means including a reference voltage generating means for generating a reference voltage representing the regulated bus voltage when the solar cell power system is not in the solar array bus lockup state with the bus voltage being regulated by said shunt device, said solar array bus lockup determining further calculating the effective generated power of said solar cell means and the load power consumed by said load on the basis of the regulated bus voltage, the monitored bus voltage, the monitored discharge current, and either of the monitored solar array current or the monitored load current to generate a load power reducing signal at said output terminal when said effective generated power is greater than said load power;

whereby the state is detected in which, during a period of sunlight, the bus voltage is fixed to the output voltage of said storage battery means and in which discharge from said storage battery means continues even though said solar cell means can manage to supply all the necessary load current so that the magnitude of said load is temporarily reduced to restore the state in which the bus voltage is regulated by said shunt device.

2. A solar cell power system with a solar array bus lockup cancelling mechanism according to claim 1, wherein said solar array bus lockup determining means includes:

a first subtracting means which has two input terminals and an output terminal, said two input terminals being respectively connected to the output terminal of said load current monitor means and the output terminal of said charge/discharge current monitor means, said first subtracting means calculating the differential current between the load current and the discharge current from said storage battery means to emit through said output terminal a signal representing said differential current;

a first multiplying means which has two input terminals and an output terminal, said two input terminals being respectively connected to the output terminal of said subtracting means and said reference voltage generating means, said first multiplying means emitting through said output terminal a signal representing the product of said regulated bus voltage and said differential current;

a second multiplying means which has two input terminals and an output terminal, said two input terminals being respectively connected to the output terminal of said bus voltage monitor means and the output terminal of said load current monitor means, said second multiplying means emitting through said output terminal a signal representing the product of the bus voltage and the load current; and a first comparing means which has two input terminals and an output terminal, said two input terminals being respectively connected to the output terminals of said first and second multiplying means, said output terminal being connected to the control terminal of said load, said first comparing means comparing the product of said regulated bus voltage and said differential current with the product of said bus voltage and the load current to generate a load power reducing signal when the product of said regulated bus voltage and said differential current is greater than the product of said bus voltage and the load current.

3. A solar cell power system with a solar array bus lockup cancelling mechanism according to claim 1, wherein said solar array bus lockup determining means includes:

a second subtracting means which has two input terminals and an output terminal, said two input terminals being respectively connected to the output terminal of said load current monitor means and the output terminal of said charge/discharge current monitor means, said second subtracting means calculating the differential current between the load current and the discharge current from said storage battery means to emit through said output terminal a signal representing said differential current;

a third subtracting means which has two input terminals and an output terminal, said two input terminals being respectively connected to said reference voltage generating means and the output terminal of said bus voltage monitor means, said third subtracting means calculating the differential voltage between said regulated bus voltage and the monitored bus voltage to emit through said output terminal a signal representing said differential voltage;

a third multiplying means which has two input terminals and an output terminal, said two input terminals being respectively connected to the output terminals of said second and third subtracting means, said third multiplying means emitting through said output terminal a signal representing the product of said differential voltage and said differential current;

a fourth multiplying means which has two input terminals and an output terminal, said two input terminals being respectively connected to the output terminal of said bus voltage monitor means and the output terminal of said charge/discharge current monitor means, said fourth multiplying means emitting through said output terminal a signal representing the product of the bus voltage and the discharge current from said storage battery means; and a second comparing means which has two input terminals and an output terminal, said two input terminals being respectively connected to the output terminals of said third and fourth multiplying means, said output terminal being connected to the control terminal of said load, said second comparing means comparing the product of said differential voltage and said differential current with the product of said bus voltage and said discharge current to generate a load power reducing signal when the product of said differential voltage and said differential current is greater than the product of said bus voltage and said discharge current.

4. A solar cell power system with a solar array bus lockup cancelling mechanism according to claim 1, wherein said solar array bus lockup determining means includes:

a fifth multiplying means which has two input terminals and an output terminal, said input terminals being respectively connected to said reference voltage generating means and the output terminal of said solar array current monitor means, said fifth multiplying means calculating the product of said regulated bus voltage and said solar array current to emit through said output terminal a signal representing said product;

an adding means which has two input terminals and an output terminal, said two input terminals being respectively connected to the output terminal of said solar array current monitor means and the output terminal of said charge/discharge current monitor means, said adding means calculating the sum current of the solar array current and the charge/discharge current to emit through said output terminal a signal representing said sum current;

a sixth multiplying means which has two input terminals and an output terminal, said two input terminals being respectively connected to the output terminal of said bus voltage monitor means and the output terminal of said adding means, said sixth multiplying means emitting through said output terminal a signal representing the product of the bus voltage and said sum current; and a third comparing means which has two input terminals and an output terminal, said two input terminals being respectively connected to the output terminals of said fifth and sixth multiplying means, said output terminal being connected to the control terminal of said load, said third comparing means comparing the product of said regulated bus voltage and said solar array current with the product of said bus voltage and said sum current to generate a load power reducing signal when the product of said regulated bus voltage and said solar array current is greater than the product of said bus voltage and said sum current.

5. A solar cell power system with a solar array bus lockup cancelling mechanism according to claim 1, wherein said solar array bus lockup determining means includes:

a fourth subtracting means which has two input terminals and an output terminal, said two input terminals being respectively connected to said reference voltage generating means and the output terminal of said bus voltage monitor means, said fourth subtracting means calculating the differential voltage between said regulated bus voltage and the monitored bus voltage to emit through said output terminal a signal representing said differential voltage;

a seventh multiplying means which has two input terminals and an output terminal, said two input terminals being respectively connected to the output terminal of said fourth subtracting means and the output terminal of said solar array current monitor means, said seventh multiplying means emitting through said output terminal a signal representing the product of said differential voltage and the solar array current;

an eighth multiplying means which has two input terminals and an output terminal, said two input terminals being respectively connected to the output terminal of said bus voltage monitor means and the output terminal of said charge/discharge current monitor means, said eighth multiplying means emitting through said output terminal a signal representing the product of the bus voltage and the discharge current; and a fourth comparing means which has two input terminals and an output terminal, said two input terminals being respectively connected to the output terminals of said seventh and eighth multiplying means, said output terminal being connected to the control terminal of said load, said fourth comparing means comparing the product of said differential voltage and the solar array current with the product of said bus voltage and the discharge current to generate a load current reducing signal when the product of said differential voltage and said solar array current is greater than the product of said bus voltage and said discharge current.

6. A solar cell power system with a solar array bus lockup cancelling mechanism according to claim 1, wherein said first and second unilateral current transmission means consist of diodes and wherein said charge storage means consists of a capacitor.

7. A solar cell power system with a solar array bus lockup cancelling mechanism, comprising:

a common return line;

a solar cell means having an output terminal and a terminal connected to said return line;

a shunt device connected in parallel between the output terminal of said solar cell means and said return line;

a power bus;

a first unilateral current transmission means which has an input terminal connected to the output terminal of said solar cell means and an output terminal connected to said power bus and which allows a current to flow only from the output terminal of said solar cell means toward said power bus;

a storage battery means which has an output terminal and a terminal which is connected to said return line;

a charging means which is connected to said power bus and the output terminal of said storage battery means in series with said storage battery means;

a second unilateral current transmission means which has an input terminal connected to the output terminal of said storage battery means and an output terminal connected to said power bus and which allows a current to flow only from the output terminal of said power storage means toward said power bus;

a charge storage means connected between said power bus and said return line;

a load which has a first terminal connected to said power bus, and a second terminal connected to said return line;

a charge/discharge current monitor means which has an output terminal and which is connected to said storage battery means to monitor the charge/discharge current that charges said storage battery means or that is discharged therefrom, emitting through said output terminal a signal representing the charge/discharge current thus monitored;

a bus voltage monitor means which has an output terminal and which is inserted between said power bus and said return line to monitor the bus voltage in said power bus, emitting through said output terminal a signal representing the bus voltage thus monitored;

a solar array current monitor means which has an output terminal and which is connected to said first unilateral current transmission means to monitor the solar array current flowing from said first unilateral current transmission means to said power bus, emitting through said output terminal a signal representing the solar array current thus monitored, or a load current monitor means which has an output terminal and which is connected to said load to monitor the load current, emitting through said output terminal a signal representing the load current thus monitored;

a solar array bus lockup determining means which has three input terminals and an output terminal, two of said three input terminals being respectively connected to the output terminal of said charge/discharge current monitor means and the output terminal of said bus voltage monitor means, the remaining one input terminal being connected to either the output terminal of said solar array current monitor means or the output terminal of said load current monitor means, said solar array bus lockup determining means including a reference voltage generating means for generating a reference voltage representing the regulated bus voltage when the system is not in the solar array bus lockup state with the bus voltage being regulated by said shunt device, and calculating the effective generated power of said solar cell means and the load power consumed by said load on the basis of said regulated bus voltage, the monitored bus voltage, the monitored discharge current, and either of the monitored solar array current or the monitored load current to generate a solar array bus lockup signal at said output terminal when said effective generated power is greater than said load power; and a solar array bus lockup cancelling drive means which has an input terminal connected to the output terminal of said storage battery means, an output terminal connected to said power bus, and a control terminal connected to the output terminal of said solar array bus lockup determining means, said solar array bus lockup cancelling drive means responding to said solar array bus lockup signal to accumulate for a predetermined time solar array bus lockup cancelling drive energy supplied from said storage battery means and to discharge said solar array bus lockup cancelling drive energy to said power bus after said predetermined time has elapsed;

whereby the solar cell power system is released from the state in which, during a period of sunlight, the bus voltage is fixed to the output voltage of said storage battery means andfin which discharge from said storage battery means continues even though said solar cell means can manage to supply all the necessary load current, and is restored, without temporarily reducing the magnitude of said load, to the state in which the bus voltage is regulated by said shunt device.

8. A solar cell power system with a solar array bus lockup cancelling mechanism according to claim 7, wherein said solar array bus lockup cancelling drive means includes:
- a diode which has a cathode and an anode, said cathode being connected to said power bus;
- a coil connected between the anode of said diode and the output terminal of said storage battery means;
- a transistor connected between the anode of said diode and said return line; and
- a drive which is connected between said transistor and the output terminal of said solar array bus lockup determining means, said drive responding to said solar array bus lockup signal to drive said transistor for a predetermined time.

9. A solar cell power system with a solar array bus lockup cancelling mechanism according to claim 7, wherein said first and second unilateral current transmission means consist of diodes and wherein said charge storage means consists of a capacitor.

10. A solar cell power system having a solar cell which provides power to a power bus, a shunt device that stablizes the power bus voltage, a storage battery which provides power to said power bus during eclipse time and which is charged by a charging means during sunlight, said system comprising:
- a charge/discharge current monitor means which emits a signal representing the charge/discharge current that charges said storage battery means or that is discharged therefrom;
- a bus voltage monitor means which emits a signal representing the bus voltage in said power bus;
- a solar array current monitor means which emits a signal representing the solar array current flowing from said solar cell to said power bus; and
- a solar array bus lock-up determining means which generates a signal if solar array bus lock-up occurs, on the basis of signals from said bus voltage monitor means, said solar array current monitor means and said charge/discharge current monitor means.

11. A solar cell power system as set forth in claim 10 wherein said solar array bus lock-up determining means includes:
- a reference voltage generating means which generates a reference voltage equal to the regulated bus voltage when the solar cell power system is not in the solar array bus lock-up state;
- a first multiplying means which calculates a first product of said reference voltage and said solar array current and emits a signal representing said first product;
- an adding means which calculates the sum current of said solar array current and said charge/discharge current and emits a signal representing said sum current;
- a second multiplying means which calculates a second product of said bus voltage and said sum current and emits a signal representing said second product; and
- the comparing means which compares said first product with said second product and generates a signal to indicate whether solar array bus lock-up has occurred.

12. A solar cell power system as set forth in claim 10 wherein said solar array bus lock-up determining means includes:
- a reference voltage generating means which generates a reference voltage equal to the regulated bus voltage when the solar cell power system is not in the solar array bus lock-up state;
- a subtracting means which calculates the differential voltage between said reference voltage and said bus voltage and emits a signal representing said differential voltage;
- a first multiplying means which calculates a first product of said differential voltage and said solar array current and emits a signal representing said first product;
- a second multiplying means which calculates a second product of said bus voltage and said charge/discharge current and emits a signal representing said second product; and
- a comparing means which compares said first product with said second product and generates a signal to indicate whether solar array bus lock-up has occurred.

13. A solar cell power system as set forth in claim 10 further comprising: a load means connected to said power bus.

14. A solar cell power system as set forth in claim 13 wherein said load means provides control means whereby said load can be reduced.

15. A solar cell power system as set forth in claim 14 wherein said load is reduced by said control means on the basis of said signal generated by said solar bus lock-up determining means.

16. A solar cell power system as set forth in claim 10 which includes a solar array bus lock-up cancelling drive means which is connected to said power bus which responds to said signal generated by said solar array bus lock-up determining means and accumulates energy supplied from said storage battery for a pre-determined time and discharges said energy to said power bus after said pre-determined time has elapsed.

17. A solar cell power system as set forth in claim 16 wherein said solar array bus lock-up cancelling drive means includes:
- a diode which has a cathode and anode said cathode being connected to said power bus;
- a coil connected between the anode of said diode and the output terminal of said storage battery;
- a transistor connected to said diode; and
- a drive means which is connected between said transistor and said solar array bus lock-up determining means.

18. A solar cell power system having a solar cell which provides power to a power bus while a shunt device that stablizes the power bus voltage, and a storage battery which provides power to said power bus during eclipse time and which is charged by a charging means during sunlight, said system further comprising:
- a charge/discharge current monitor means which emits a signal representing the charge/discharge current that charges said storage battery or that is discharged therefrom;
- a bus voltage monitor means which emits a signal representing the bus voltage in said power bus;
- a means for connecting a load means to said power bus;
- a load current monitor means which emits a signal representing the load current flowing from said power bus to said load; and
- a solar array bus lock-up determining means which generates a signal if solar array bus lock-up occurs, on the basis of signals from said charge/discharge current monitor means, said bus voltage monitor means and said load current monitor means.

19. A solar cell power system as set forth in claim 18, wherein said solar array bus lock-up determining means includes:
- a reference voltage generating means which generates a reference voltage equal to the regulated bus voltage when the solar cell power system is not in the solar array bus lock-up state;
- a subtracting means which calculates the differential current between said load current and said charge/discharge current and emits a signal representing said differential current;
- a first multiplying means which calculates a first product of said reference voltage and said differential current and emits a signal which represents said first product;
- a second multiplying means which calculates a second product of said bus voltage and said load current and emits a signal representing said second product;
- a comparing means which compares said first product with said second product and generates a signal to indicate whether solar array bus lock-up has occurred.

20. A solar cell power system as set forth in claim 18 wherein said solar array bus lock-up determining means includes:
- reference voltage generating means which generates a reference voltage equal to the regulated bus voltage when the solar cell power system is not in the solar array bus lock-up state;
- a first subtracting means which calculates the differential current between said load current and said charge/discharge current and emits a signal representing the said differential current;
- a second subtracting means which calculates the differential voltage between said reference voltage and said monitored bus voltage and emits a signal representing said differential voltage;
- a first multiplying means which calculates a first product of said differential voltage and said differential current and emits a signal representing said first product;
- a second multiplying means which calculates a second product of said bus voltage and said charge/discharge current and emits a signal representing said second product; and
- a comparing means which compares said first product with said second product and generates a signal to indicate whether solar array bus lock-up has occured.

21. A solar cell power system as set forth in claim 18, wherein said load means provides control means whereby said load can be reduced.

22. A solar cell power system as set forth in claim 21 wherein said load is reduced by said control means on the basis of said signal generated by said solar array bus lock-up determining means.

23. A solar cell power system as set forth in claim 18 which includes a solar array bus lock-up cancelling drive means which is connected to said power bus which responds to said signal generated by said solar array bus lock-up determining means and accumulates energy supplies from said storage battery for a pre-determined time and discharges said energy to said power bus after said pre-determined time has elapsed.

24. A solar cell power system as set forth in claim 23 which wherein said solar array bus lock-up cancelling drive means includes:
- a diode which has a cathode and anode said cathode being connected to said power bus;
- a coil connected between the anode of said diode and the output terminal of said storage battery;
- a transistor connected to said diode; and
- a drive means which is connected between said transistor and said solar array bus lock-up determining means.

25. A solar cell power system as set forth in any one of claims 11, 12, 19 and 20 further comprising a load means connected to said power bus.

26. A solar cell power system as set forth in claim 25 wherein said load means includes control means whereby said load means can be reduced on the basis of the signal generated by said solar bus lock-up determining means.

* * * * *